United States Patent [19]
Bourget

[11] Patent Number: 5,975,230
[45] Date of Patent: Nov. 2, 1999

[54] MOTORCYCLE FRAME HAVING LOWERED SEAT AND INTEGRAL OIL RESERVOIR

[76] Inventor: Joseph Roger Bourget, 5009 W. Greenway, Glendale, Ariz. 85306

[21] Appl. No.: 09/023,892

[22] Filed: Feb. 13, 1998

[51] Int. Cl.⁶ ..................................................... B62D 61/02
[52] U.S. Cl. .......................... 180/225; 180/229; 180/311; 280/831
[58] Field of Search .................................. 180/68.2, 219, 180/225, 229, 311; 280/216, 831

[56] References Cited

U.S. PATENT DOCUMENTS

| | | | |
|---|---|---|---|
| 3,945,463 | 3/1976 | Okano et al. | 180/311 |
| 4,461,489 | 7/1984 | Tsukiji et al. | 180/225 |
| 4,690,236 | 9/1987 | Shinozaki et al. | 180/311 |
| 5,054,571 | 10/1991 | Takasaka | 180/225 |
| 5,474,317 | 12/1995 | Piszkin | 280/283 |

*Primary Examiner*—M. Evans
*Assistant Examiner*—William R. Zimmerli
*Attorney, Agent, or Firm*—Cahill, Sutton & Thomas, P.L.C.

[57] ABSTRACT

A motorcycle frame is formed of tubular members which are hollow to provide a reservoir for oil used to lubricate the motor of the motorcycle. Fittings are provided within the tubular frame for receiving an oil filler cap, an oil spill hole, an outlet to the oil pump, an oil return inlet, an oil drain, and a crankcase vent. The seating area of the motorcycle frame is dropped closer to the ground due to the elimination of the oil reservoir normally located below the seating area of the frame, while incorporating a dampened rear wheel swing arm frame.

17 Claims, 2 Drawing Sheets

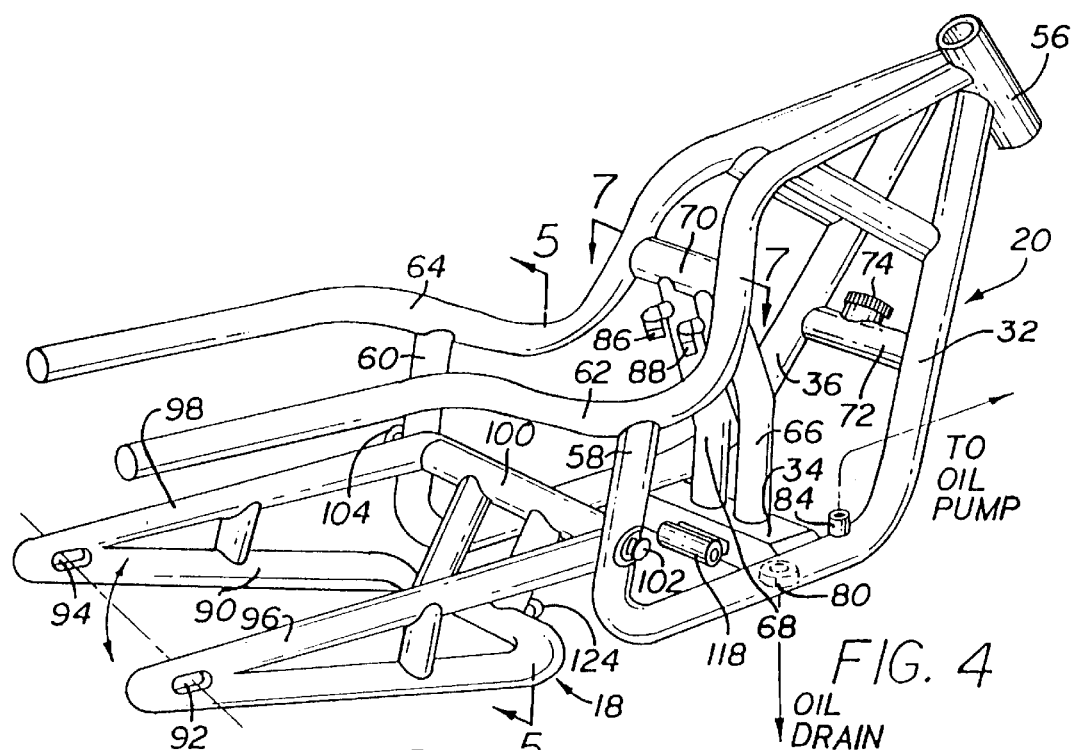
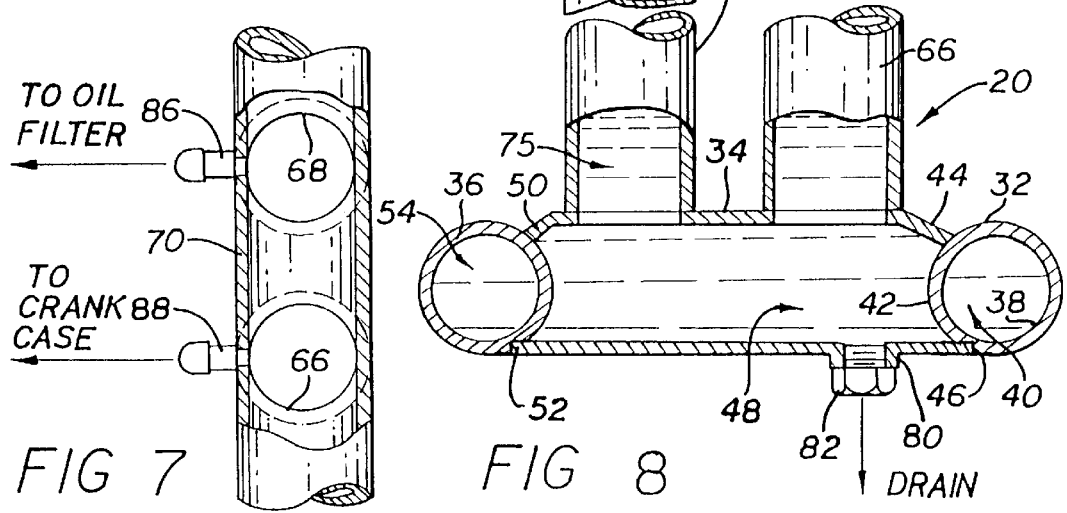

MOTORCYCLE FRAME HAVING LOWERED SEAT AND INTEGRAL OIL RESERVOIR

BACKGROUND OF THE INVENTION

1. Field of the Invention

The present invention relates generally to motorcycles, and more particularly, to a motorcycle frame structure having a lowered seating area and integral oil reservoir.

2. Description of the Relevant Art

Motorcycles have been used for transportation for many years and are still popular today. A particular segment of the motorcycle market consists of high-performance motorcycles having relatively large and powerful engines. Perhaps the most well-known manufacturer of such high performance motorcycles is the Harley Davidson Company of Milwaukee, Wis.

Consumers of such high performance motorcycles have often expressed a desire for the seating area of such motorcycles to be relatively close to the ground, allowing the rider to sit "low in the saddle" in a somewhat reclining position. These seats are sometimes referred to as "drop seats" and are particularly appealing to riders of smaller stature. However, there are certain structural limitations which, until now, have precluded manufacturers of motorcycle frames from locating the seating area relatively close to the ground.

Conventional high performance motorcycles include an oil tank or reservoir, sometimes known in the trade as an "oil bag", that is typically located below the seating area of the frame. This oil reservoir serves to store oil that circulates around the pistons and other moving components of the engine under pressure applied by an oil pump. In addition, the frame structure typically includes a floating rear swingarm suspension that is pivotally secured to the central portion of the motorcycle frame by a pivot axle and bearings located directly below the seating area. A pair of shock absorbers extend between the pivot mount and rear portion of the frame to dampen rapid pivotal movements of the rear suspension as may be caused by driving the motorcycle over bumps and other irregular surfaces. This dampened rear suspension is sometimes known in the trade as a "softail" style frame. The transmission that couples the motor to the rear drive wheel must also typically fit below the seat area. Thus, in the past, there have been structural limitations which have precluded motorcycle manufacturers from lowering the seating area of the motorcycle frame.

In an effort to lower the seating area of a motorcycle frame, some manufacturers have been known to eliminate the rear suspension and rigidly attach the frame members that support the rear wheel directly to the remaining portion of the motorcycle frame. While this method of manufacturing has allowed for lowering of the seating area of the frame, it does so at a substantial cost, namely, a rough and uncomfortable ride. Even though such motorcycle frame constructions provide a rough ride, the strong desire by motorcycle riders to ride low in the saddle has persuaded some riders to tolerate such a rough ride in order to achieve their goal of sitting lower on the bike.

Accordingly, it is an object of the present invention to provide a motorcycle frame structure which includes a seating area that is located relatively close to the ground, thereby allowing a rider to ride low in the bike.

It is another object of the present invention to provide such a motorcycle frame structure which effectively eliminates the conventional oil reservoir as an obstacle toward the goal of lowering the seating area of the frame structure.

It is a further object of the present invention to provide such a motorcycle frame structure which achieves the objective of lowering the seating area while preserving the benefits of a floating, dampened rear suspension.

A still further object of the present invention is to provide such a motorcycle frame structure which more effectively cools the oil used to lubricate the moving components of the motor.

These and other objects of the present invention will become more apparent to those skilled in the art as the description of the present invention proceeds.

SUMMARY OF THE INVENTION

Briefly described, and in accordance with the preferred embodiment thereof, the present invention relates to a motorcycle frame structure including a first tubular frame member for supporting a motor of the motorcycle, and at least a second tubular frame member extending generally perpendicular thereto. Each of the first and second tubular frame members has an outer wall enclosing a hollow channel. A first joint is formed to secure a first end of the second tubular frame member to the first tubular frame member at an opening formed in the outer wall thereof for allowing the hollow channels of the first and second tubular frame members to communicate with each other. An oil fill port, which is preferably covered by a removable oil filler cap, communicates with the first and second hollow channels for allowing a user to introduce lubricating oil into such hollow channels. In this manner, the tubular frame members serve as lubricating oil sump or reservoir.

A third tubular frame member is preferably included which, like the first tubular frame member, supports the motor. The second tubular frame member also extends generally perpendicular to the third tubular frame member, and a second joint secures the second end of the second tubular frame member to the third tubular frame member at an opening formed in the outer wall thereof. Thus, the second tubular frame member couples together the hollow channels extending through the first and third tubular frame members, and the third tubular frame member thereby becomes part of the lubricating oil sump. The tubular frame members can advantageously be formed from aluminum tubing, and the joints formed between the second tubular frame member and the first and third tubular frame members can be formed by TIG welding. The motorcycle frame structure includes a neck race for supporting the front fork and front wheel of the motorcycle. Preferably, the above-described first and third tubular frame members each include a front end secured to said neck race.

The motorcycle frame structure preferably includes an oil drain port communicating with the hollow channels of the aforementioned tubular frame members for allowing a user to drain contaminated lubricating oil therefrom; this drain port may be formed within the lower portion of the second tubular frame member, if desired. The oil drain port is ordinarily sealed by an oil drain plug removably secured thereto, as by a threaded engagement.

Ideally, the aforementioned motorcycle frame structure includes a series of ports for allowing the circulation of lubricating oil stored in the frame structure to various engine components. For example, an oil pump port communicates with the hollow channel of the first tubular frame member for allowing lubricating oil to be withdrawn therefrom by an oil pump during operation of the motorcycle motor; this oil pump port may be provided in the form of a nipple extending from the first tubular frame member. An oil return port also communicates with the hollow channels of the tubular frame members for allowing lubricating oil in the motor to be returned to the hollow channels of the tubular frame members during operation of the motorcycle motor.

The aforementioned first and third tubular frame members each include a lowermost portion that is most proximate to the ground; these lowermost portions of the first and third tubular frame members are spaced apart from each other, and the aforementioned second tubular frame member is preferably joined therebetween. Incidentally, the oil fill port is disposed above the lowermost portions of the first and third tubular frame members. The motorcycle frame structure of the present invention may also include a fourth tubular frame member having a lower end joined with the second tubular frame member and extending generally vertically upward therefrom, with the hollow channel of this fourth tubular frame member communicating with the hollow channel of the second tubular frame member therebelow. If desired, the fourth tubular frame member can have a spill hole formed therein at a predetermined height above the lowermost portions of the first and third tubular frame members. This spill hole allows lubricating oil filling the hollow channels of the motorcycle frame structure to spill out of the spill hole when the proper amount of oil has been introduced into the oil fill port and stored within the motorcycle frame. A sealing plug is removably secured within such spill hole, as by threaded engagement, for sealing the spill hole between oil filling procedures.

The aforementioned oil return port may be provided by a fitting extending from the fourth tubular frame member, preferably at a height located above the oil spill hole; such fitting is in communication with the hollow channel extending within the fourth tubular frame member. Likewise, a further fitting may extend from the fourth tubular frame member, in communication with the hollow channel thereof, and disposed above the level of the oil spill hole, for receiving a vent hose adapted to vent the motor crankcase.

The first and third tubular frame members also include rear portions located to the rear of the lowermost portions thereof, and spaced apart from each other. These rear portions of the first and third tubular frame members extend generally upward for supporting a seating area of the motorcycle frame.

It has been mentioned above that a floating rear suspension helps cushion bumps in the road, and to such purpose, the motorcycle frame structure of the present invention preferably includes a pivot axle extending between the first and third tubular frame members, and a rear wheel swing arm frame for supporting a rear wheel of the motorcycle. The rear wheel swing arm frame is pivotally supported by the pivot axle to the first and third tubular frame members. At least one shock absorber extends between the rear wheel swing arm frame and the second tubular frame member for regulating pivotal movement of the rear wheel swing arm frame relative to the rest of the motorcycle frame structure.

Ideally, the motorcycle frame structure of the present invention includes first and second seating area frame members for supporting a seat; these first and second seating area support members are generally spaced apart from each other, and are supported by the rear portions of the first and third tubular frame members, respectively. Because the lubricating oil is stored within the motorcycle frame structure, and no oil bag is required, these first and second seating area frame members can extend to within eighteen inches of the lowermost portions of the first and third tubular frame members, thereby allowing the seat to be supported relatively close to the ground.

BRIEF DESCRIPTION OF THE DRAWINGS

FIG. 4 is a perspective view of the motorcycle frame structure upon which the motorcycle of FIG. 1 is constructed.

FIG. 5 is an enlarged cross-sectional view of the lower portion of the motorcycle frame structure shown in FIG. 4., taken through the plane indicated by lines 5—5 in FIG. 4, and including a shock absorber forming part of the rear suspension.

FIG. 7 is a cross-sectional view of the motorcycle frame structure shown in FIG. 4 taken through the plane designated by lines 7—7 in FIG. 4.

FIG. 8 is a cross-sectional view of the motorcycle frame structure shown in FIG. 6, taken through the plane designated by lines 8—8 in FIG. 6, and illustrating a lower cross tubular frame member joined to a pair of spaced tubular frame members.

DETAILED DESCRIPTION OF THE PREFERRED EMBODIMENT

Figure 1:
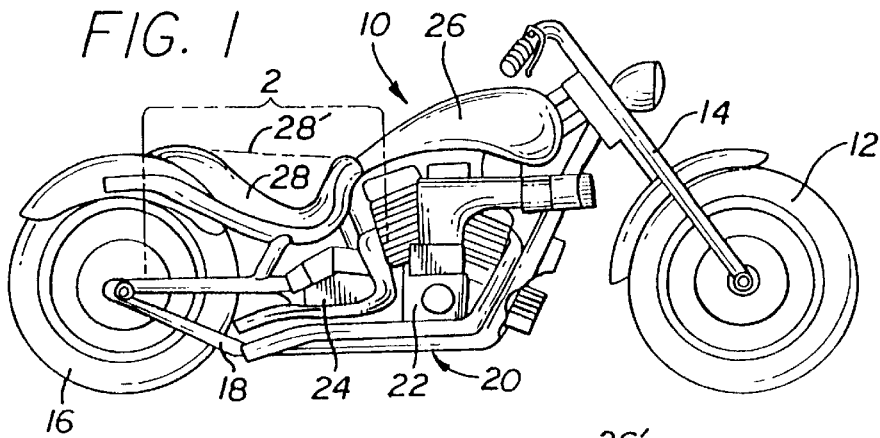
FIG. 1 is a side view of a motorcycle incorporating the frame structure of the present invention.

FIG. 1 illustrates a motorcycle, designated generally by reference numeral 10, incorporating the novel frame structure of the present invention. Motorcycle 10 includes a front wheel 12 supported by a front fork 14, which together form a front end of motorcycle 10. Rear wheel 16 is supported by a swing arm frame 18 for providing a softer ride, as described in greater detail below. Motorcycle 10 further includes a central frame structure 20 to which the front end fork 14 and swing arm frame 18 are connected; central frame structure 20 supports motor 22, transmission 24, gas tank 26, and drop seat 28.

Figure 2:
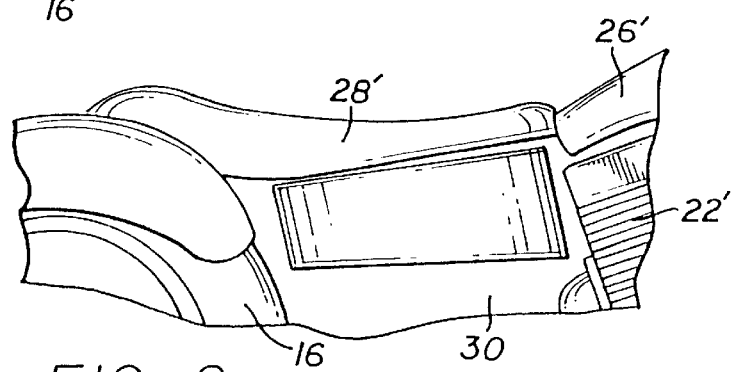
FIG. 2 is a partial view of the motorcycle shown in FIG. 1 but illustrating a prior art oil bag of the type conventionally disposed below the seating area of prior art motorcycles.
Figure 3:
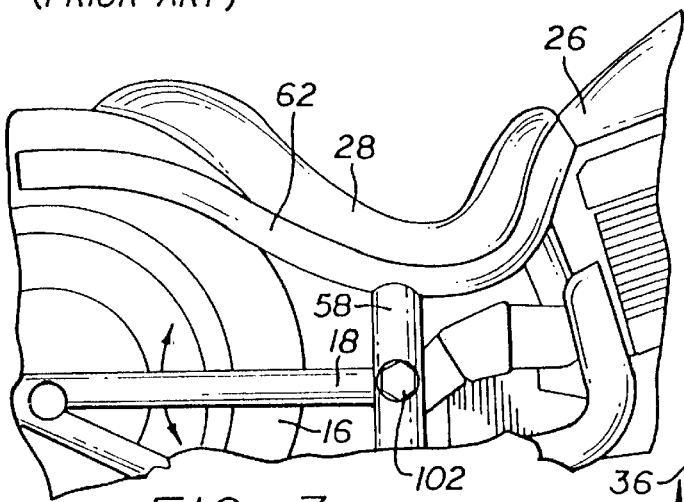
FIG. 3 is an enlarged partial view of the seating area of the motorcycle shown in FIG. 1.

Referring briefly to the prior art drawing of FIG. 2, a conventional oil reservoir, or "oil bag" 30, is shown positioned directly below seat 28'. Oil bag 30 is typically disposed above the transmission 24 (see FIG. 1), and the combined height of the oil bag 30 and transmission 24 limits the extent to which seat 28' can be lowered toward the ground, particularly if motorcycle 10 is to incorporate a rear suspension afforded by swing arm frame 18. Also shown in the prior art drawing of FIG. 2 are the motor 22' and gas tank 26'. The contour of conventional seat 28' is indicated in FIG. 1 by dashed line 28' in FIG. 1. In contrast, as shown in FIG. 3, drop seat 28 extends much closer toward the ground, and the conventional oil bag is omitted, while still incorporating swing arm frame 18 for providing a softer rear suspension.

Referring now to FIG. 4, the novel motorcycle frame structure of the present invention is designated generally by reference numeral 20 and includes a first tubular frame member 32, a second tubular frame member 34, and a third tubular frame member 36. Each of tubular frame members 32, 34 and 36 includes an outer wall surrounding a hollow channel. For example, referring to FIG. 8, tubular frame member 32 includes a first outer wall 38 that surrounds a first hollow channel 40. Each of tubular frame members 32, 34 and 36 is preferably formed of aircraft billet aluminum tubing. Tubular frame members 32 and 36 are generally cylindrical before being bent to shape, and measure approximately 1½ inches in diameter. Such tubing is preferably of the type designated 188 Wall Dom T6 6061 aircraft billet aluminum tubing. Tubular frame members 32 and 34 are bent to the shape shown in FIG. 4 for supporting the motor, transmission, and other components of motorcycle 10. Tubular frame member 34 is preferably made from similar aluminum stock but has a rectangular, rather than circular, cross-sectional shape.

Figure 6:
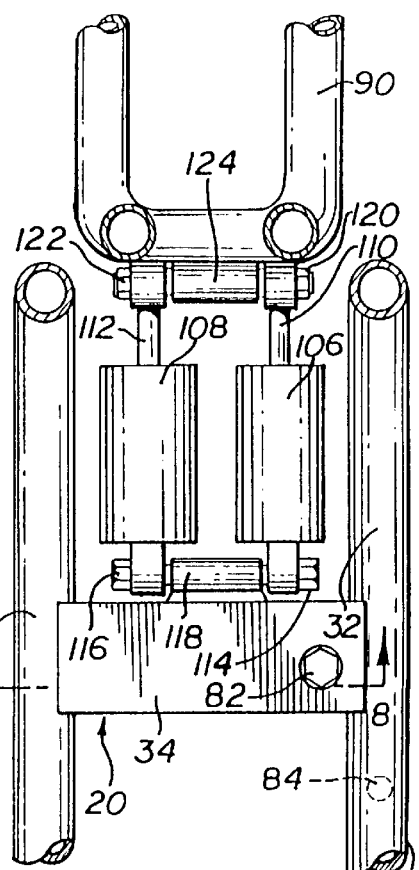
FIG. 6 is a bottom view of the motorcycle frame structure shown in FIG. 5.

As shown in FIGS. 4, 6 and 8, second tubular frame member 34 extends generally perpendicular to first and third tubular frame members 32 and 36. Referring again to FIG. 8, an opening 42 is formed in the outer wall 38 of first tubular frame member 32 for exposing hollow channel 40 thereof. A first end 44 of second tubular frame member 34 abuts outer wall 38 of first tubular frame member 32 overlying opening 42 thereof. A first joint 46 secures first end 44 of second tubular frame member 34 to first tubular frame member 32 over opening 42, thereby allowing a second hollow channel 48 of second tubular frame member 34 to communicate with first hollow channel 40 of first tubular frame member 32. Likewise, a second end 50 of second tubular frame member 34 abuts the outer wall of third tubular frame member 36 overlying a similar opening formed therein, and a second joint 52 secures second end 50 of second tubular frame member 34 to third tubular frame member 32 for allowing hollow channel 48 to communicate with the third hollow channel 54 of third tubular frame member 36. Joints 46 and 52 are preferably formed by TIG (tungsten inert gas) welding using 4043 aluminum welding rod.

As shown in FIG. 4, the forwardmost ends of tubular frame members 32 and 36 are welded to a neck race 56. Neck race 56 is used to rotatably support front fork 14 of motorcycle 10 (see FIG. 1). Each of first and third tubular frame members 32 and 36 includes a lowermost portion closest to the ground; these lowermost portions of tubular frame members 32 and 36 are spaced apart from each other, and second tubular frame member 34 extends therebetween. The opposing rearmost ends 58 and 60 of tubular frame members 32 and 36, respectively, are also spaced apart from each other and extend generally upward for supporting a seating area of central motorcycle frame structure 20. In this regard, central frame structure 20 includes first and second top tubes, or seating area frame members 62 and 64 for supporting drop seat 28 and gas tank 26 (see FIG. 1). These top tubes 62 and 64 are generally spaced apart from each other, except near their forwardmost ends where they are welded to neck race 56. Top tubes 62 and 64 are also welded to, and supported by, the upwardly directed rear portions 58 and 60, respectively, of first and third tubular frame members 32 and 36, respectively.

Referring to FIGS. 4, 5 and 8, central frame structure 20 further includes a pair of tubular upright frame members 66 and 68 each having a lower end joined with second tubular frame member 34 and extending generally vertically upward therefrom. The lower ends of tubular upright frame members 66 and 68 are welded over corresponding openings formed in the second tubular frame member 34; each of tubular frame members 66 and 68 has a hollow channel that communicates with the hollow channel of second tubular frame member 34. The upper ends of tubular upright frame members 66 and 68 are each welded to a cross tube 70 which is in turn welded between top tubes 62 and 64 near the front of the seating area of central frame 20.

As mentioned above, the central frame structure 20 is designed to eliminate the conventional prior art oil bag. It does this by storing lubricating oil within the hollow channels of the tubular frame members that form central frame structure 20. Referring to FIG. 4, cross tube 72 extends between tubular frame members 32 and 36 and is welded over openings formed in each of tubular frame members 32 and 36. Cross tube 72 includes an oil fill port, ordinarily covered by an oil filler cap 74; cross tube 72 communicates with the hollow channels extending within tubular frame members 32 and 36 for allowing a user to introduce lubricating oil into the hollow channels of tubular frame members 32, 34, 36, 66, and 68 simply by pouring lubricating oil into the oil fill port. This oil fill port is disposed above the lowermost portions of first and third tubular frame members 32 and 36, not quite halfway up from such lowermost portions toward neck race 56. Oil fill cap 74 is removably secured to the oil fill port, by a threaded engagement, for covering such oil fill port when lubricating oil is not being introduced therethrough. The volume provided by the hollow channels of tubular frame members 32, 34, 36, 66 and 68 is sufficient to hold up to 3 quarts of lubricating oil. Within FIGS. 5 and 8, the lubricating oil that fills the hollow channels of tubular frame members 32, 34, and 36, and that fills upright tubular frame members 66 and 68 is designated by reference numeral 75.

As shown in FIG. 8, an oil spill hole 76 is formed in upright tubular frame member 68 at a predetermined height above the lowermost portions of first and third tubular frame members 32 and 36; this predetermined height is below the level of the oil fill port and is selected to correspond to the height at which the proper quantity of lubricating oil is stored within central frame structure 20. Oil spill hole 76 is threaded and is ordinarily covered by a mating sealing plug 78 removably secured within spill hole 76 for sealing spill hole 76 between oil filling procedures. During oil filling procedures, oil fill cap 74 and sealing plug 78 are removed; lubricating oil is added through the oil fill port until lubricating oil rising in the hollow channel of upright tubular frame member 68 just begins to spill out of oil spill hole 76, indicating that the proper quantity of lubricating oil has been introduced into the motorcycle frame.

Lubricating oil 75 stored within central frame structure 20 becomes used and contaminated over time and must be changed at periodic intervals. For such purpose, a threaded oil drain port 80 is formed in the bottom of tubular frame member 34 in communication with the hollow channel 48 thereof for allowing a user to drain contaminated lubricating oil 75 from the hollow channels of central frame structure 20. Oil drain port 80 is ordinarily sealed by a mating threaded oil drain plug 82 removably secured to oil drain port 80. During oil draining procedures, oil drain plug 82 is removed from oil drain port 80, and stored lubricating oil 75 drains under the force of gravity from the hollow channels of central frame structure 20.

Of course, the purpose of storing lubricating oil 75 within central frame structure 75 is to provide a reservoir of lubricating oil that can be circulated over critical moving engine parts. The motor 22 of motorcycle 10 includes an oil pump (not shown) which has an inlet for withdrawing oil from an oil reservoir; in the past, such oil was withdrawn from the "oil bag". In the case of the present invention, an oil pump port, in the form of a nipple 84, extends upwardly from tubular frame member 32 and communicates with the hollow channel 40 thereof. Nipple 84 is adapted to receive an end of a hose (not shown) extending to the inlet of the oil pump (not shown) to allow lubricating oil to be withdrawn from hollow channel 40 of tubular frame member 32 by the oil pump during operation of the motorcycle motor.

Once lubricating oil has been circulated over critical moving engine parts, such lubricating oil must be returned to the lubricating oil reservoir. In the case of the present invention, such lubricating oil must be returned from motor 22 back to central frame structure 20. For this purpose, a fitting 86 is threadedly engaged with upright tubular frame member 68 in communication with the hollow channel thereof, as shown in FIGS. 4 and 7. Fitting 86 preferably engages upright tubular frame member 68 at a height above the level of spill hole 76, and oil returned through fitting 86 simply falls into the hollow channel of upright tubular frame member 68. Fitting 86 is adapted to receive the end of a hose (not shown) connected to the outlet of the oil filter for receiving lubricating oil that leaves motor 22.

In addition to oil return fitting 86, many motorcycle motors require a separate crankcase vent line to serve as a vent between the motor crankcase and the oil storage reservoir. In this regard, an oil vent fitting 88 is provided near the top of upright tubular frame member 66, similar in appearance and function to oil return fitting 86 described above. Oil vent fitting 88 is in communication with the hollow channel of upright tubular frame member 66, and is adapted to receive a vent hose (not shown) extending to the motor crankcase, thereby providing a vent between the motor crankcase and the hollow channels of central frame structure 20.

It has been mentioned above that it is desirable to incorporate a floating rear suspension having a rear swing arm frame 18 to absorb road shock and soften the ride of motorcycle 10. Referring to FIGS. 4, 5, and 6, rear swing arm frame 18 includes a U-shaped bottom tubular frame member 90 having rear axle mounting holes 92 and 94 formed in the opposing rear ends thereof for supporting the rear axle of rear wheel 16 (see FIG. 1). Rear swing arm frame 18 further includes a pair of upper tubular support arms 96 and 98 which extend forwardly of openings 92 and 94 toward a cross tube 100 to which the forwardmost ends of support arms 96 and 98 are welded. Cross tube 100, and hence rear swing arm frame 18, is pivotally supported from central frame structure 20 by a pivot axle that extends between the upwardly-directed rear portions 58 and 60 of tubular frame members 32 and 36; the ends of such pivot axle are secured by bolts 102 and 104, and suitable bearings may be incorporated to allow the pivot axle to freely pivot. Referring to FIGS. 5 and 6, a pair of shock absorbers 106 and 108 extending between rear wheel swing arm frame 18 and tubular frame member 34. Shock absorbers 106 and 108 each include an internal spring which biases the pistons of such shock absorbers into the cylinders thereof. The weight of motorcycle 10 partially overcomes the biasing force of such springs, allowing the piston rods 110 and 112 of such shock absorbers to be partially extended from shock absorbers 106 and 108, respectively. The cylinder ends of shock absorbers 106 and 108 are secured by mounting bolts 114 and 116 to a mounting bracket 118 welded to tubular frame member 34. Likewise, the piston rod ends of shock absorbers 106 and 108 are secured by mounting bolts 120 and 122, respectively, to a mounting bracket 124 welded to U-shaped bottom tubular frame member 90. Shock absorbers 106 and 108 thereby regulate pivotal movement of the rear wheel swing arm frame 18 relative to central frame structure 20.

Those skilled in the art will now appreciate that an improved motorcycle frame structure has been described which eliminates the conventional oil bag, and which includes a seating area that is located relatively close to the ground, thereby allowing a rider to ride low in the bike. Indeed, it has been found that top tubes 62 and 64 can extend downwardly toward the lowermost portions of first and third tubular frame members 32 and 36 in the seating area as to come within eleven inches thereof. The lowered seating position is achieved while still retaining the softer ride provided by a dampened rear wheel swing arm frame. Moreover, due to the greater exposed surface area of the central frame structure, the lubricating oil contained by such frame structure is more effectively cooled during the operation of the motorcycle. While the present invention has been described with respect to a preferred embodiment thereof, such description is for illustrative purposes only, and is not to be construed as limiting the scope of the invention. Various modifications and changes may be made to the described embodiment by those skilled in the art without departing from the true spirit and scope of the invention as defined by the appended claims.

I claim:

1. A motorcycle frame structure comprising in combination:

a. a first tubular frame member for supporting a motor of the motorcycle, said first tubular frame member having a first outer wall surrounding a first hollow channel, said first tubular frame member having a lowermost portion disposed relatively close to the ground;

b. a second tubular frame member having a second outer wall and a second hollow channel;

c. said second tubular frame member being coupled to said first tubular frame member proximate the lowermost portion thereof for allowing said second hollow channel to communicate with said first hollow channel; and d. an oil fill port disposed above the lowermost portion of said first tubular frame member and communicating with one of the first and second hollow channels for allowing a user to introduce lubricating oil into the first and second hollow channels.

2. A motorcycle frame structure as recited by claim 1 further including an oil filler cap removably secured to said oil fill port for covering said oil fill port when lubricating oil is not being introduced therethrough.

3. A motorcycle frame structure as recited by claim 1 including:

a. an oil drain port communicating with one of the first and second hollow channels for allowing a user to drain contaminated lubricating oil from said first and second hollow channels; and b. an oil drain plug removably secured to said oil drain port.

4. A motorcycle frame structure as recited by claim 1 including a neck race for supporting the front end of the motorcycle, and wherein said first tubular frame member has at least one end secured to said neck race.

5. A motorcycle frame structure as recited by claim 1 wherein said first and second tubular frame members are formed of aluminum tubing, and including a first joint securing a first end of said second tubular frame member to said first tubular frame member, said first joint being formed by a TIG weld.

6. A motorcycle frame structure as recited by claim 1 including an oil pump port communicating with said first hollow channel of said first tubular frame member, said oil pump port being adapted to allow lubricating oil to be withdrawn from said first hollow channel by an oil pump during operation of the motorcycle motor.

7. A motorcycle frame structure as recited by claim 6 wherein said oil pump port is formed by a nipple extending from said first tubular frame member.

8. A motorcycle frame structure as recited by claim 6 including an oil return port communicating with at least one of said first and second hollow channels of said first and second tubular frame members, respectively, said oil return port being adapted to allow lubricating oil in the motor to be returned to said first and second hollow channels during operation of the motorcycle motor.

9. A motorcycle frame structure as recited by claim 1 including:
 a. a third tubular frame member for supporting the motor of the motorcycle, said third tubular frame member having a third outer wall surrounding a third hollow channel, said first and third outer walls having openings formed therein;
 b. said second tubular frame member extending generally perpendicular to said first and third tubular frame members, and said second tubular frame member having first and second opposing ends; and
 c. a first joint securing the first end of said second tubular frame member to said first tubular frame member at the opening formed in said first outer wall for allowing said first and second hollow channels to communicate with each other, and a second joint securing the second end of said second tubular frame member to said third tubular frame member at the opening formed in said third outer wall for allowing said first and second hollow channels to communicate with said third hollow channel.

10. A motorcycle frame structure as recited by claim 9 including a neck race for supporting the front end of the motorcycle, and wherein said first and third tubular frame members each have a front end secured to said neck race.

11. A motorcycle frame structure comprising in combination:
 d. a first tubular frame member for supporting a motor of the motorcycle, said first tubular frame member having a first outer wall surrounding a first hollow channel, said first outer wall having an opening formed therein;
 e. a second tubular frame member having a second outer wall and a second hollow channel, said second tubular frame member extending generally perpendicular to said first tubular frame member and having a first end;
 f. a first joint securing the first end of said second tubular frame member to said first tubular frame member at the opening formed in said first outer wall for allowing said second hollow channel to communicate with said first hollow channel;
 g. an oil fill port communicating with one of the first and second hollow channels for allowing a user to introduce lubricating oil into the first and second hollow channels;
 h. a third tubular frame member for supporting the motor of the motorcycle, said third tubular frame member having a third outer wall surrounding a third hollow channel, said third outer wall having an opening formed therein;
 i. said second tubular frame member extending generally perpendicular to said third tubular frame member, and said second tubular frame member having a second end; and
 j. a second joint securing the second end of said second tubular frame member to said third tubular frame member at the opening formed in said third outer wall for allowing said first and second hollow channels to communicate with said third hollow channel;
 k. wherein each of said first and third tubular frame members includes a lowermost portion that is most proximate to the ground, the lowermost portions of said first and third tubular frame members being spaced apart from each other, wherein said second tubular frame member is joined between the lowermost portions of said first and third tubular frame members, and wherein said oil fill port is disposed above the lowermost portions of said first and third tubular frame members.

12. A motorcycle frame structure as recited by claim 11 wherein said first and third tubular frame members each include a rear portion located to the rear of the lowermost portions thereof, the rear portions of said first and third tubular frame members being spaced apart from each other and extending generally upward for supporting a seating area of the motorcycle frame, said motorcycle frame structure further including:
 a. a pivot axle extending between said first and third tubular frame members;
 b. a rear wheel swing arm frame for supporting a rear wheel of the motorcycle, said rear wheel swing arm frame being pivotally supported by said pivot axle to said first and third tubular frame members; and
 c. at least one shock absorber extending between said rear wheel swing arm frame and second tubular frame member for regulating pivotal movement of the rear wheel swing arm frame relative to said first and third tubular frame members.

13. A motorcycle frame structure as recited by claim 12 including first and second seating area frame members for supporting a seat, said first and second seating area support members being generally spaced apart from each other and being supported by the rear portions of said first and third tubular frame members, respectively, said first and second seating area frame members extending to within eighteen inches of the lowermost portions of said first and third tubular frame members.

14. A motorcycle frame structure as recited by claim 11 including a fourth tubular frame member having a lower end joined with said second tubular frame member and extending generally vertically upward therefrom, said fourth tubular frame member having a fourth hollow channel communicating with said second hollow channel of said second tubular frame member.

15. A motorcycle frame structure as recited by claim 14 wherein said fourth tubular frame member has a spill hole formed therein at a predetermined height above the lowermost portions of said first and third tubular frame members, said spill hole allowing lubricating oil within said fourth hollow channel to spill therefrom when oil is introduced into the oil fill port and the proper quantity of lubricating oil has been introduced into the motorcycle frame.

16. A motorcycle frame structure as recited by claim 15 including a sealing plug removably secured within said spill hole for sealing said spill hole between oil filling procedures.

17. A motorcycle frame structure as recited by claim 15 including a fitting extending from said fourth tubular frame member and in communication with the fourth hollow channel thereof for receiving a vent hose adapted to vent the motor crankcase.

* * * * *